D. BLYDENBURGH.
THREADING BOARD FOR LACE MACHINE CARRIAGES.
APPLICATION FILED AUG. 2, 1919.
1,410,051.   Patented Mar. 21, 1922.
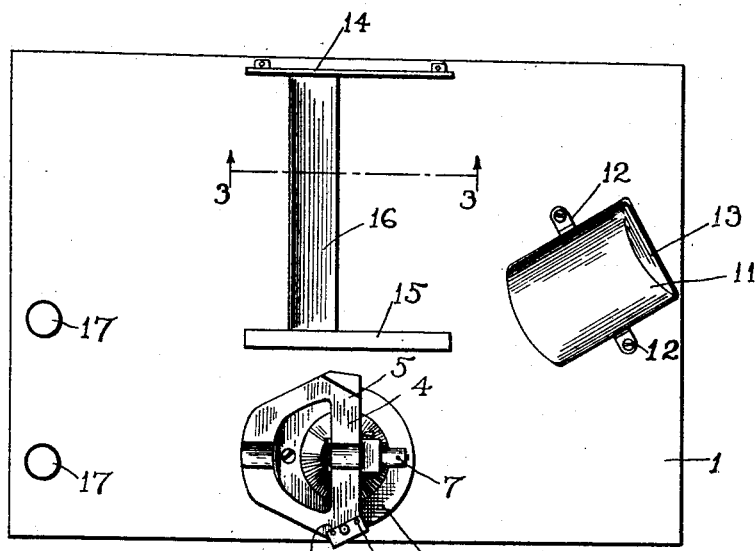
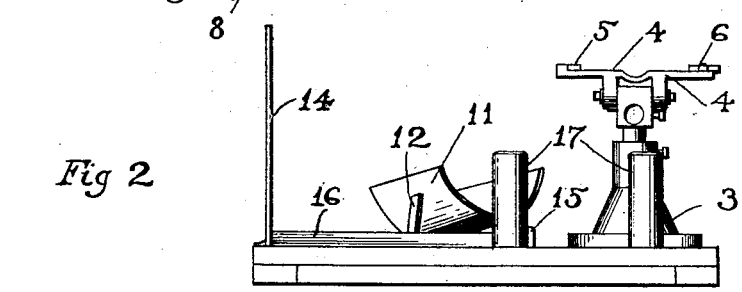
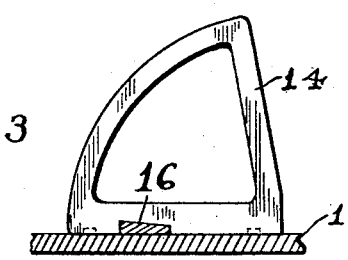
Inventor
Daniel Blydenburgh
By Joshua R. H. Potts
Attorney

UNITED STATES PATENT OFFICE.

DANIEL BLYDENBURGH, OF SOUTH ATTLEBORO, MASSACHUSETTS.

THREADING BOARD FOR LACE-MACHINE CARRIAGES.

1,410,051.

Specification of Letters Patent. Patented Mar. 21, 1922.

Application filed August 2, 1919. Serial No. 314,981.

*To all whom it may concern:*

Be it known that I, DANIEL BLYDENBURGH, a citizen of the United States, residing at South Attleboro, county of Bristol, and State of Massachusetts, have invented certain new and useful Improvements in Threading Boards for Lace-Machine Carriages, of which the following is a specification.

My invention relates to threading devices for lace machine carriages, and the object of my invention is to provide a threading board equipped with means for holding the filled bobbins, the empty carriages, means for assembling the carriages and bobbins, and threading the carriages, and means for holding the assembled and threaded carriages.

My invention will be more readily understood by reference to the accompanying drawings forming a part of this specification and in which—

Figure 1 is a plan view of a threading board embodying my invention.

Figure 2 is an end elevation of the same.

Figure 3 is a section on the line 3—3 of Figure 1, and

Figure 4 is a detail plan view of a portion of the threading device.

Referring now to the drawings, 1 indicates a board upon which the several elements are mounted. Arranged at the front of the board is a threading stand 2, said stand being similar to that disclosed in my Patent No. 1,338,809. This stand comprises a fixed base 3 and a pivoted table 4 adjustably mounted thereon and adapted to receive the carriage to be threaded and provided with stops 5 and 6 to properly position the carriage thereon. A hook 7 is suitably supported adjacent the table 4 and is adapted to pass through the eye of the carriage when the table is tilted, all as is fully described in the afore-mentioned pending application.

In order to adapt the table 4 to carriages of different sizes, the stop 6 is preferably adjustable, as shown clearly in Figure 4. As shown therein, said stop comprises a plate pivotally mounted on a screw 8 and provided with a pair of apertures 9, 9, spaced equi-distant from the screw 8. A pin 10 projects upwardly from the table 4 and is adapted to engage in one of the apertures 9. The screw 8 and the apertures 9 are arranged in alinement and to one side of the center of the block 6 so that by loosening the screw 8 and swinging the block 6 so that the opposite aperture 9 will engage the pin 10 the block may be adjusted so as to increase or diminish the distance between the inner edge of the same and the opposite stop 5. Arranged back of and to the right of the stand 2 is a holder 11 for the filled bobbins. This is a cylindrical trough supported upon suitable legs 12 and inclined rearwardly to an end 13. It is obvious that the circular bobbins will rest conveniently therein for reach by the operator of the device. Directly back of the threader is a rack for the empty carriages. This comprises a skeleton frame 14 of substantially the size and shape of the carriages, a forward stop 15 comprising a strip secured to the board 1 and a beveled strip 16 extending from the member 14 to the member 15 and forming a stop for the portion of the carriage formed by the notch provided for the catch bar of the lace machine. This prevents the carriage from slipping from the grasp of the operator as he grasps one to place upon the table 4. To the left of the threader 2 are a pair of spaced uprights or posts 17 between which are placed the filled and threaded carriages.

In operating the device, the operator takes a carriage from the carriage support with the left hand and places the same upon the table 4 with the carriage eye above the hook 7. It will be noted that the arrangement of the several parts is such that it will not be necessary to turn the carriage to adjust the same to the table. At the same time, with the right hand, a filled bobbin is taken from the holder 11 and placed within the aperture provided for the same in the carriage. The table 4 is then rocked to bring the hook 7 through the eye of the carriage, the thread is looped under the same, and the table righted, drawing the thread through the eye of the carriage after which the carriage is lifted from the table and placed between the supports 17.

I claim:—

1. In a device of the class described, a pivotally mounted table, a hook adjacent thereto, stops on said table to position a carriage thereon, and means for adjusting one of said stops, substantially as described.

2. In a device of the class described, a pivotally mounted table, a hook adjacent thereto, stops on said table to position a carriage thereon, one of said stops comprising a plate, an eccentric pivot for said plate and means for holding said plate in adjusted position, substantially as described.

3. In a device of the class described, a pivotally mounted table, a hook adjacent thereto, stops on said table to position a carriage thereon, one of said stops comprising a plate, an eccentrically positioned pivot screw for said plate, co-operating apertures and pin on said plate and carriage for holding said plate in adjusted position, substantially as described.

4. A device as set forth in claim 3 in which said apertures are arranged in said plate equal distant each side of said pivot screw, substantially as described.

In testimony whereof I have signed my name to this specification in the presence of two subscribing witnesses.

DANIEL BLYDENBURGH.

Witnesses:
STANLEY N. CHASE,
GEORGE N. BLYDENBURGH.